United States Patent
Max et al.

(10) Patent No.: US 11,960,627 B2
(45) Date of Patent: Apr. 16, 2024

(54) METHOD FOR ANONYMIZING VEHICLE DATA

(71) Applicant: Volkswagen Aktiengesellschaft, Wolfsburg (DE)

(72) Inventors: Stephan Max, Gifhorn (DE); Martin Wegner, Braunschweig (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 372 days.

(21) Appl. No.: 17/622,653

(22) PCT Filed: May 20, 2020

(86) PCT No.: PCT/EP2020/064079
§ 371 (c)(1),
(2) Date: Dec. 23, 2021

(87) PCT Pub. No.: WO2020/259931
PCT Pub. Date: Dec. 30, 2020

(65) Prior Publication Data
US 2022/0358247 A1  Nov. 10, 2022

(30) Foreign Application Priority Data
Jun. 28, 2019  (DE) .......................... 102019209487.2

(51) Int. Cl.
*G06F 21/62* (2013.01)
*G08G 1/01* (2006.01)
*H04W 4/46* (2018.01)

(52) U.S. Cl.
CPC ....... *G06F 21/6254* (2013.01); *G08G 1/0112* (2013.01); *G08G 1/0125* (2013.01); *G08G 1/0141* (2013.01); *H04W 4/46* (2018.02)

(58) Field of Classification Search
CPC ..... H04W 4/46; G08G 1/0112; G08G 1/0125; G08G 1/0141
(Continued)

(56) References Cited

U.S. PATENT DOCUMENTS 9,147,353 B1 * 9/2015 Slusar ................... G06Q 40/08
10,449,967 B1 * 10/2019 Ferguson ............. G08G 1/0129
(Continued)

FOREIGN PATENT DOCUMENTS

DE   102011106295 A1   1/2012
DE   102011083677 A1   4/2013
(Continued)

OTHER PUBLICATIONS

Myounggyu et al., "Toward Mitigating Phantom Jam Using Vehicle-to-Vehicle Communication," 2017, vol. 18, Publisher: IEEE.*
(Continued)

*Primary Examiner* — Tuan C To
(74) *Attorney, Agent, or Firm* — Peter Zura; LOZA & LOZA, LLP

(57) ABSTRACT

Technologies and techniques for anonymizing vehicle data. A data set is created on the basis of captured vehicle data and includes information regarding the location and/or time of the data capture. The information may be anonymized on the basis of traffic flow data by locally concealing the information regarding the location of the data capture and/or by temporally concealing the information regarding the time of the data capture. The traffic flow data may be based on group information received by the vehicle providing the vehicle data via vehicle-to-vehicle communication from other vehicles. A related motor vehicle and a network server directed to the anonymization is also provided herein.

19 Claims, 2 Drawing Sheets

(58) Field of Classification Search
USPC .......................................................... 701/117
See application file for complete search history.

(56) References Cited

U.S. PATENT DOCUMENTS

| | | | |
|---|---|---|---|
| 10,679,420 B2* | 6/2020 | Rudman | G06V 20/20 |
| 10,693,872 B1* | 6/2020 | Larson | H04L 9/3231 |
| 10,956,982 B1* | 3/2021 | Hayward | G07C 5/008 |
| 2013/0030688 A1 | 1/2013 | Shimizu et al. | |
| 2014/0309814 A1* | 10/2014 | Ricci | G06V 40/28 |
| | | | 701/2 |
| 2016/0210853 A1* | 7/2016 | Koravadi | G06V 20/56 |
| 2016/0242223 A1* | 8/2016 | Brahmi | H04W 76/16 |
| 2017/0364758 A1* | 12/2017 | Minster | G01S 17/86 |
| 2019/0256096 A1* | 8/2019 | Graf | G08G 1/0129 |
| 2020/0127812 A1* | 4/2020 | Schuler | H04L 9/50 |
| 2020/0393847 A1* | 12/2020 | Govindan | G08G 1/096725 |

FOREIGN PATENT DOCUMENTS

| | | |
|---|---|---|
| DE | 102016202659 B3 | 9/2016 |
| DE | 102015213393 A1 | 1/2017 |
| DE | 102016009195 B3 | 12/2017 |
| DE | 102016225287 A1 | 6/2018 |
| EP | 3096258 A1 * 11/2016 | ........... G06F 16/285 |
| WO | WO-2015134476 A1 * 9/2015 | ......... A61B 5/02055 |

OTHER PUBLICATIONS

Anh-Tu et al., "An Indexed Bottom-up Approach for Publishing Anonymized Data," 2012, Publisher: IEEE.*
PCT/EP2020/064079. International Search Report (dated Sep. 1, 2020).

* cited by examiner

METHOD FOR ANONYMIZING VEHICLE DATA

RELATED APPLICATIONS

The present application claims priority to International Patent App. No. PCT/EP2020/064079 to Max et al., filed May 20, 2020, which further claims priority to German Pat. App. No. 10 2019 209 487.2 filed Jun. 28, 2019, the contents of each being incorporated by reference in their entirety herein.

TECHNICAL FIELD

The present disclosure relates to technologies and techniques for anonymizing vehicle data, in particular for anonymizing vehicle data transmitted to a server on the basis of vehicle-to-vehicle (V2V) data received from a motor vehicle and from other vehicles that also transmit data to the server.

BACKGROUND

Vehicles are nowadays almost always capable of data communication with the network servers of service providers by means of the use of mobile communication technologies (depending on network coverage). The service provider, for example, a vehicle manufacturer, can implement various services, for example, the provision of information data on traffic, weather, traffic jams, etc. by means of communication technologies. The implementation or improvement of such services may also require the transmission of data from the vehicles to the network server. These so-called fleet data can be used to provide information data regarding traffic density and traffic disruptions, for example, but also information regarding local weather or a parking space situation almost in real time and, for example, in the form of map information.

Such fleet data are created based on data sets that are transmitted by individual vehicles to the network server. The individual data set therein includes, for example, information regarding a position and speed of the vehicle, and regarding data measured by one or more sensors of the vehicle. Based on such a data set, it is possible to determine, for example, whether the vehicle is standing in a traffic jam, whether the vehicle is exposed to a rain shower, whether the vehicle is driving a route with poor roadway quality, or whether the vehicle is driving through a construction site. Such information can be determined, for example, based on sensor data from a rain sensor, a sensor for the immersion depth of one or more shock absorbers, or an imaging sensor (optionally coupled with image recognition).

However, based on a data set that is transmitted by a vehicle, it is also possible to determine information regarding the vehicle to the use of which the vehicle driver did not consent. Furthermore, the use of said data by unauthorized third parties is associated with the risk of misuse, for example, if movement profiles of vehicles, and thus of people, are created. Various methods for anonymizing such vehicle data sets are therefore already known in the prior art.

DE 10 2011 106 295 A1 discloses a method whereby vehicle-generated information data are transmitted to a service provider by means of a backend server device of a security operator. All data that enable the vehicle to be identified therein are only transmitted to the backend server device which, however, does not transmit said data to the service provider. The document also discloses the collection of information data from a number of vehicles by the backend server device and the joint transmission thereof to the service provider for anonymizing the information data of the vehicles. However, this procedure always assumes the trustworthiness of the security operator or the security of the backend server device against attacks.

DE 10 2016 225 287 A1 by the inventors discloses a method that provides for data received by a motor vehicle to be locally or temporally concealed in order to make an assignment of said data to a single vehicle more difficult or to prevent it altogether. The concealment is preferably all the more intensified the lower the traffic flow in relation to the location and time of the data capture. This method takes advantage of the fact that the presence of a large number of vehicles that are transmitting data makes it more difficult to assign said data to individual vehicles. The traffic flow is determined therein using sensor data from the vehicle, wherein it is assumed that all vehicles transmit data sets to the network server.

However, since, in reality, not all vehicles are equipped with the technology for uploading data sets yet, and since the addressed network servers can also vary, the size of an anonymization group is expanded by means of correction factors, whereby the concealment is enhanced. Since such a concealment can also affect the usability of the data sets, such an enhanced concealment of the data sets due to the correction factors is disadvantageous.

BRIEF SUMMARY

The present disclosure is therefore based on aspects of enriching the prior art and on proposing technologies and techniques for anonymizing vehicle data which overcomes or at least reduces the disadvantages of the prior art and, in particular, enables a needs-based anonymization or concealment of vehicle data.

Aspects of the present disclosure are addressed by the subject matter of the independent claims, found below. Preferred improvements are the subject of the respective dependent claims.

One aspect of the present disclosure relates to a method for anonymizing vehicle data carried out by a motor vehicle. With this method according to the present disclosure, initially, a data set is created on the basis of the vehicle data captured by the motor vehicle. In addition to the vehicle data, said data set also contains information regarding the location and/or time of the data capture. Such information regarding the location and/or time may be necessary for the usability of the vehicle data, but, at the same time, it may enable identification of the motor vehicle. The method according to the present disclosure also provides for receiving group information from other vehicles by means of vehicle-to-vehicle communication. Persons skilled in the art are familiar with the technical details of vehicle-to-vehicle communication (Car2Car, Vehicle2Vehicle), for example, using pWLAN, which is why these technical details will not be discussed in detail here.

With the method according to the present disclosure, traffic flow data are also determined on the basis of the group information received by means of vehicle-to-vehicle communication. In other words, it is determined how many of the other vehicles, with which the vehicle-to-vehicle communication is carried out, are located in a predetermined environment of the vehicle and/or pass a location, where the data is being captured by the motor vehicle, within a predetermined time. Based on the number of other vehicles determined in this way or based on the traffic flow data, the present disclosure also provides for anonymizing the data set, in particular by locally concealing the information regarding the location and/or by temporally concealing the information regarding the time of the data capture. The data set that has been anonymized in this way is finally transmitted to a network server. The network server therefore only has anonymized data, and any tracking of individual vehicles or persons is rendered more difficult or impossible.

In some examples, vehicle data are captured by means of at least one first sensor that is configured to capture environmental data. The at least one first sensor is designed therein for capturing sensor signals relating to the environment of the vehicle. An environmental signal received by means of the at least one first sensor therefore enables the motor vehicle to obtain information regarding its environment and preferably depicts a plurality of environmental information. Used as a first sensor are, for example, imaging sensors, such as cameras, or distance sensors, such as LIDAR.

The capture of vehicle data also preferably takes place by means of at least one second sensor that is configured to capture vehicle data. The at least one second sensor is designed therein for capturing sensor signals relating to the vehicle itself. A status signal received by means of the at least one second sensor preferably enables the motor vehicle to obtain information regarding its own status and, for this purpose, preferably depicts a plurality of status information. A second sensor is thus a wheel tachometer, and the like, for example.

In some examples, the vehicle-to-vehicle communication takes place by means of a first communication module. The communication module herein is a first communication module configured for communication with a network server and other motor vehicles. In addition, the communication module can be configured to communicate with other devices such as, for example, GPS satellites or a smart infrastructure. The communication module preferably has a radio, cellular, WLAN and/or Bluetooth transceiver, or alternative wireless communication devices.

In some examples, a method is disclosed for anonymizing vehicle data that is carried out by a network server. Here, a data set is received from a motor vehicle, wherein the data set is based on vehicle data captured by the motor vehicle and, in addition to the vehicle data, said data also comprises information regarding the location and/or time of the data capture. Furthermore, the network server receives traffic flow data from the motor vehicle, wherein the traffic flow data are based on group information that by the motor vehicle receives by means of vehicle-to-vehicle communication and from other vehicles. In some examples, the received data set is anonymized further on the basis of the traffic flow data that are also received, in particular by a local concealment of the information regarding the location of the data capture and/or temporal concealment of the information regarding the time of the data capture.

In some examples, certain configuration may advantageously enable the availability of data sets, which are determined based on the vehicle data, that are ultimately always only available in anonymous form for further processing. The anonymization takes place as a function of a traffic flow relative to the area of the data collection. The vehicles regularly communicate among each other their respective positions, speeds, directions, etc., particularly locally by means of pWLAN or C-V2X (Cellular V2X) by means of car-2-car communication. The motor vehicle receiving these messages from other vehicles accordingly receives information regarding the fact that and regarding how many correspondingly equipped vehicles are in communication range, as well as their positions, directions of travel, etc. This information is used, advantageously, in the context of the methods according to the present disclosure for estimating the traffic flow and, based thereupon, for anonymizing the data sets.

The various embodiments of the present disclosure as outlined in this disclosure can be advantageously combined with one another, unless specified otherwise in individual cases.

BRIEF DESCRIPTION OF THE DRAWINGS

The present disclosure will be described below in exemplary embodiments with reference to the associated drawings in which.

DETAILED DESCRIPTION

Figure 1:
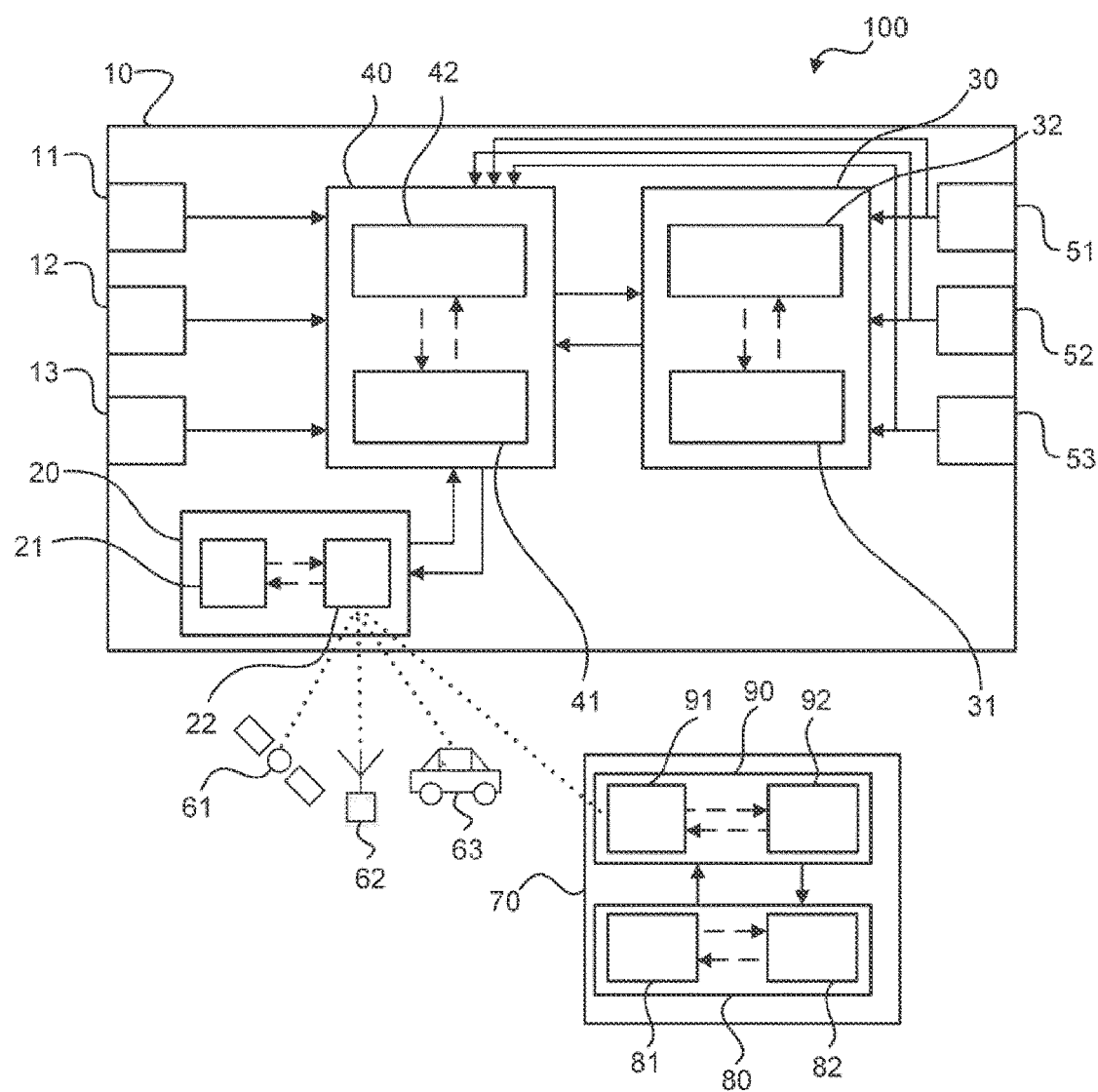
FIG. 1 shows a schematic representation of a system that includes a motor vehicle and a network server according to some aspects of the present disclosure.

In some examples, group information received by the motor vehicle from various other vehicles may indicate that the other vehicles are also transmitting data sets to the network server. The group information therein is received individually by each of the other vehicles, and it indicates that the respective vehicle is communicating with said same network server as the vehicle that is capturing the vehicle data. This way, it is ensured that the other vehicles are "visible" for the network server and therefore suitable for anonymizing the vehicle data. The totality of the group information received from the motor vehicle therefore specifies the total number of vehicles that are in communication with the network server.

Furthermore, the group information received from the motor vehicle preferably also includes the location, the speed and/or the direction of travel of the other vehicle transmitting the group information to the motor vehicle. The information can advantageously be used to determine a traffic flow at the location of the data capture, for example, by facilitating an estimate of as to how many of the other vehicles have passed or will pass the location of the data capture within a predetermined period of time. The greater the number of these vehicles, the more reliable will be any anonymization thereof.

In some examples detailed herein, the data sets are anonymized, preferably, by means of local concealment. In doing so, the data are concealed with regard to the location where they were captured. The anonymization is also preferably carried out by a temporal concealment, wherein the data are concealed with regard to the point in time when they were captured. Group anonymity is achieved due to the local concealment and temporal concealment, whereby the captured data can only be assigned to a sufficiently large group of vehicles, and no longer to a single vehicle or to a few vehicles. Therefore, it becomes increasingly difficult, or only with a disproportionately large amount of effort, to draw conclusions about personal data on the basis of the data.

In some examples, a given level of the local and/or temporal concealment is inversely proportional to a group size of the other vehicles determined based on the group information.

Likewise, preferably, a given level of the local and/or temporal concealment is inversely proportional to the level of a traffic flow determined on the basis of the group information at the location of the data capture. In other words, the method according to the present disclosure provides that the greater the traffic flow in relation to the location or point in time of capture of the data by the motor vehicle, the smaller the local or temporal concealment. As mentioned earlier, the goal of concealment is group anonymity, wherein this goal can be achieved even with a low level of concealment if the traffic flow is large.

If the traffic flow is low, however, a large concealment makes sense in order to effectively exclude any personal references. For example, during the day, on a motorway, a measured value of a large number of vehicles is usually captured in a short amount of time.

Minor concealment may be sufficient in such a case. At night, on a back road with little traffic, a measured value may only be captured from a single vehicle. In this case, extensive concealment is appropriate. By determining the traffic flow based on the group information received by means of vehicle-to-vehicle communications, it is ensured that only those vehicles are taken into account that are at all "visible" for the network server of a service provider, due to their own transmission of data sets.

Furthermore, the local concealment may be carried out by assigning the received data set to a grid. The data can be integrated into a km grid, for example. A location of the data capture is preferably replaced by a spatial area of the data capture. The location of the data capture is also preferably shifted, particularly preferably along a route traveled by the vehicle. The value of the data has not been excessively reduced therein; but it is no longer possible to draw conclusions as to personal data on the basis of this data. The temporal concealment is likewise preferably carried out by shifting the time the measured values of the received data are taken. In the simplest case, the measurement times can be evenly distributed using the point in time of the shifting. Also preferably, the time of the data capture is replaced by a time range of data capture. In these embodiments for the implementing the method, the size of the ranges or the degree of shifting is preferably inversely proportional to a given group size determined by means of the group information.

In some examples, the traffic flow data are also based on environmental data that are captured by vehicle sensors. Environmental data, such as distances and speeds of vehicles surrounding the motor vehicle, are determined by means of first sensors of the motor vehicle. These data are preferably used, in addition to the group information, for determining the traffic flow, in particular insofar as the traffic flow itself has informational content, that is to say not necessarily for anonymizing the vehicle data sets.

Other aspects of the present disclosure relate to a motor vehicle, such as a passenger vehicle with an internal combustion engine, an electric or hybrid motor, which is configured to carry out the steps of a motor vehicle according to the method according to the present disclosure. For this purpose, the motor vehicle comprises at least one first sensor configured to capture environmental data, and at least one second sensor configured to capture vehicle data.

The at least one first sensor is designed herein to capture sensor signals relating to the environment of the vehicle. The at least one second sensor therein is designed to capture sensor signals relating to the vehicle itself. In this context, an environmental signal that is received by means of the at least one first sensor preferably enables the motor vehicle to obtain information regarding its environment, and preferably it depicts a plurality of environmental information. A status signal received by means of the at least one second sensor preferably enables the motor vehicle to obtain information regarding its own status, and, for this purpose, it preferably depicts a plurality of status information. The first sensor includes, for example, imaging sensors, such as cameras, or distance sensors, such as LIDAR. The second sensors are wheel tachometers and the like, for example.

The motor vehicle according to the present disclosure may also include a first communication module configured for communication with a network server and other motor vehicles. In addition, the communication module can be configured for communications with other devices such as, for example, GPS satellites or a smart infrastructure. The communication module preferably comprises a radio, cellular, WLAN and/or Bluetooth transceiver, or alternative wireless communication devices.

The motor vehicle also includes a first control unit that is configured to communicate with the at least one first sensor for capturing environmental data of a motor vehicle, with the at least one second sensor for capturing status data of the motor vehicle, and with the first communication module of the motor vehicle. The control unit is also configured to carry out the methods according to the present disclosure. The first control unit is designed, for example, to capture vehicle data by means of at least one first sensor that is configured to capture environmental data and/or by means of at least one second sensor that is configured to capture vehicle data to create a data set on the basis of the captured vehicle data, wherein the data set comprises information regarding the location and/or the time of the data capture, to receive group information from other vehicles by means of vehicle-to-vehicle communication by means of the first communication module, to determine traffic flow data based on the group information that is received by means of vehicle-to-vehicle communication, to anonymize the data set on the basis of the traffic flow data by locally concealing the information regarding the location of the data capture and/or by temporally concealing the information regarding the time of the data capture, and to transmit the anonymized data set to a network server. Preferred embodiments of the motor vehicle correspond to the preferred embodiments for implementing the method as explained above with reference to the method according to the present disclosure.

Other aspects of the present disclosure relate to methods of operating a control unit of a motor vehicle, which includes at least one first sensor that is configured to capture environmental data, at least one second sensor that is configured to capture status data of the motor vehicle, and a communication module, a driving system configured to automatically drive the motor vehicle, and the control unit. Vehicle data may be captures by means of at least one first sensor that is configured to capture environmental data and/or by means of at least one second sensor that is configured to capture vehicle data. A data set may be created on the basis of captured vehicle data, wherein the data set comprises information regarding the location and/or at the time of the data capture. Group information may be received from other vehicles by means of vehicle-to-vehicle communication, and traffic flow data may be determined based on the group information received by means of vehicle-to-vehicle communication. The data set may be anonymized on the basis of the traffic flow data by locally concealing the information regarding the location of the data capture and/or by temporally concealing the information regarding the time of the data capture. The anonymized data set may then be transmitted to a network server.

Another aspect of the present disclosure relates to a computer program comprising commands which, when the program is executed by a computer, such as, for example, a control unit of a motor vehicle, cause the computer to carry out the steps of the motor vehicle according to the method according to the present disclosure, in particular the steps of: creating a data set on the basis of captured vehicle data, wherein the data set comprises information regarding the location and/or time of the data capture; receiving group information from other vehicles by means of vehicle-to-vehicle communication; determining traffic flow data based on the group information that is received by means of vehicle-to-vehicle communication; anonymizing the data set on the basis of the traffic flow data by locally concealing the information regarding the location of the data capture and/or by temporally concealing the information regarding the time of the data capture; and transmitting the anonymized data set to a network server.

Another aspect of the present disclosure relates to a network server comprising a second communication module that is configured for data communication with a plurality of motor vehicles, and a second control unit. The network server also comprises a second control unit which is configured to communicate with the first communication module of at least one motor vehicle by means of a second communication module. The control unit is also configured to carry out the steps of the network server according to the method according to the present disclosure, and it is, in particular, configured to receive a data set on the basis of captured vehicle data from a motor vehicle, wherein the data set comprises information regarding the location and/or the time of the data capture, to receive traffic flow data from the motor vehicle, wherein the traffic flow data are based on group information that are received from other vehicles by means of the vehicle-to-vehicle communication, and to anonymize the data set on the basis of the traffic flow data by means of locally concealing the information regarding the location of the data capture and/or by temporally concealing the information regarding the time of the data capture. The implementation of the individual steps and preferred embodiments for implementing the method correspond to the preferred embodiments for implementing the method as explained with reference to the method according to the present disclosure.

Another aspect of the present disclosure relates to a method of a network server of a motor vehicle which comprises at least one memory, a second communication module that is configured for communicating with a first communication module of at least one motor vehicle, and the second control unit, wherein the method comprises at least the following steps: receiving a data set on the basis of captured vehicle data from a motor vehicle, wherein the data set comprises information regarding the location and/or time of the data capture; receiving traffic flow data from the motor vehicle, wherein the traffic flow data is based on group information received from other vehicles by means of vehicle-to-vehicle communication; anonymizing the data set on the basis of the traffic flow data by locally concealing the information regarding the location of the data capture and/or by temporally concealing the information regarding the time of the data capture.

Another aspect of the present disclosure relates to a computer program comprising commands which, when the program is executed by a computer, operate like a control unit of a network server causing the computer to carry out the steps of the network server according to the method according to the present disclosure, in particular the steps of: receiving a data set on the basis of captured vehicle data from a motor vehicle, wherein the data set comprises information regarding the location and/or the time of the data capture; receiving traffic flow data from the motor vehicle, wherein the traffic flow data are based on group information that are received from other vehicles by means of vehicle-to-vehicle communication; anonymizing of the data set on the basis of the traffic flow data by locally concealing the information regarding the location of the data capture and/or by temporally concealing the information regarding the time of the data capture.

Another aspect of the present disclosure relates to a system that resides in a motor vehicle according to the present disclosure, as described herein, and a network server according to the present disclosure, as described above. Preferred embodiments of the system correspond to the preferred embodiments as those explained with reference to the motor vehicle and the server, or the preferred embodiments for implementing the methods.

The method steps according to the present disclosure can be implemented by means of electrical or electronic parts or components (hardware), by firmware (ASIC), or they can be realized by executing a suitable program (software). The method according to the present disclosure is likewise preferably realized or implemented by means of a combination of hardware, firmware, and/or software. For example, individual components for carrying out individual method steps are designed as a separately integrated circuit, or they are arranged on a common integrated circuit. Individual components that are configured to carry out individual method steps are, furthermore, preferably arranged on a (flexible) printed circuit carrier (FPCB/PCB), a tape carrier package (TCP), or on another substrate.

The individual method steps according to the present disclosure may also be configured as one or more processes that run on one or more processors in one or more electronic computing devices, and that are generated when one or more computer programs are executed. The computing devices therein are preferably designed to work together with other components, for example, with a communication module, and one or more sensors or cameras, in order to realize the functionalities as described herein. The instructions of the computer programs preferably stored in a memory, such as, for example, a RAM element. However, the computer programs can also be stored in a non-volatile storage medium such as, for example, a CD-ROM, a flash memory, or the like.

Persons skilled in the art will also appreciate that the functionalities of several computers (data processing devices) can be combined, or that they can be combined in a single device, or that the functionality of a specific data processing device can be distributed over a plurality of devices in order to carry out the steps of the method according to the present disclosure without deviating from the method according to the present disclosure.

FIG. 1 shows a schematic representation, in particular a block diagram of an exemplary motor vehicle 10, in particular a two-track motor vehicle with an internal combustion engine, an electric or hybrid motor. The motor vehicle 10 comprises a plurality of first sensors, in particular, a first sensor 11, a second sensor 12, and a third sensor 13. The first sensors 11, 12, 13 are configured to capture environmental data of the motor vehicle 10 and comprise, for example, a camera for capturing an image of an environment immediately surrounding the motor vehicle 10, distance sensors, such as, for example, ultrasonic sensors or LIDAR, for capturing distances to objects surrounding the motor vehicle 10. The first sensors 11, 12, 13 transmit the environmental signals they have captured to a first control unit 40 of the motor vehicle 10.

The motor vehicle 10 also has a plurality of second sensors, in particular. a fourth sensor 51, a fifth sensor 52, and a sixth sensor 53. The second sensors 51, 52, 53 are sensors for determining status data relating to the motor vehicle 10 itself, such as, for example, current position and movement information of the motor vehicle. The second sensors are therefore, for example, speed sensors, acceleration sensors, inclination sensors, sensors for measuring an immersion depth of a shock absorber, wheel tachometer sensors, or the like. The second sensors 51, 52, 53 transmit the status signals they have captured to the first control unit 40 of the motor vehicle 10. In addition, the second sensors 51, 52, 53 transmit their measurement results directly to a driving system 30 of motor vehicle 10.

The motor vehicle 10 also comprises a first communication module 20 with a memory 21 and one or more transponders or transceivers 22. The transponders 22 are radio, WLAN, GPS or Bluetooth transceivers, or the like. The transponder 22 communicates with the internal memory 21 of the first communication module 20, for example, by means of a suitable data bus. The first communication module 20 also communicates with the first control unit 40. In addition, the first communication module 20 is configured to communicate with a mobile network server 70, in particular a backend server of a vehicle manufacturer, contractual partner, or fleet operator. The communication takes place. in particular with a second communication module 90 of the network server 70. The first communication module 20 is preferably configured to communicate by means of a cellular network. Furthermore, the first communication module 20 is configured to communicate with other vehicles 63, in particular, the communication modules of other similar vehicles 63, in particular, by means of vehicle-to-vehicle communication.

The motor vehicle 10 also comprises the driving system 30, which may be configured for a fully automated driving operation, in particular, for longitudinal and lateral guidance of the motor vehicle 10. The driving system 30 has a navigation module 32, which is configured to calculate routes between a starting point and a destination point and to determine the maneuvers to be carried out by the motor vehicle 10 along this route. In addition, the driving system 30 comprises an internal memory 31, for example, for map materials, which communicates with the navigation module 32, for example, by means of a suitable data bus. Furthermore, the driving system 30 communicates with the control unit 40 and receives trajectory information, which the control unit 40 received from the network server 70 by means of the first communication module 20. The navigation module 32 is preferably configured to determine a route of the motor vehicle 10 based on this trajectory information.

At least some of the second sensors 51, 52, 53 of the motor vehicle 10 may transmit their measurement results directly to the driving system 30. These data that are transmitted directly to the driving system 30 are, in particular, current position and movement information of the motor vehicle. These data are captured, preferably, by speed sensors, acceleration sensors, inclination sensors, etc.

The motor vehicle 10 also comprises a first control unit 40, which is configured to carry out the method steps of the motor vehicle 10 according to the present disclosure. For this purpose, the first control unit 40 has an internal memory 41 and a CPU 42 which communicate with one another, for example, by means of a suitable data bus. In addition, the first control unit 40 is in communication with at least the first sensors 11, 12, 13, the second sensors 51, 52, 53, the first communication module 20 and the driving system 30, for example, by means of one or more respective CAN connections, one or more respective SPI connections, or other suitable data connections.

The network server 70 may have a second control unit 80, which is configured to carry out the steps of the network server 70 according to the method according to the present disclosure. For this purpose, the second control unit 80 has an internal memory 81 and a CPU 82 which communicate with one another, for example, by means of a suitable data bus. The network server 70 also has a second communication module 90. The second communication module 90 has a memory 92 and one or more transponders or transceivers 91. The transponders 91 are radio, WLAN, GPS or Bluetooth transceivers, or the like. The transponder 91 communicates with the internal memory 92 of the second communication module 90, for example, by means of a suitable data bus. Preferably, the second communication module 90 is configured to communicate by means of a cellular network.

Figure 2:
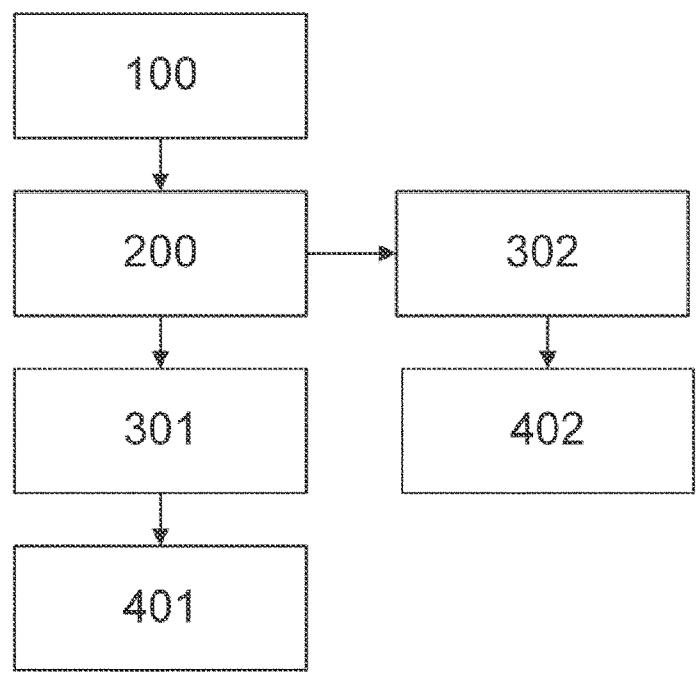
FIG. 2 shows a schematic representation of a method according to some aspects of the present disclosure.

FIG. 2 shows a schematic flow diagram of a method according to the present disclosure implemented by the system 100 according to the present disclosure.

In a first step S100 of the method according to the present disclosure, the motor vehicle 10 captures vehicle data by means of at least one first sensor 11, 12, 13 and/or by means of at least one second sensor 51, 52, 53 and creates a data set on the basis of the captured vehicle data. Said data set therein also comprises information regarding the location and/or the time of the data capture. In other words, all vehicle sensors 11, 12, 13, 51, 52, 53, such as, for example, cameras, radar, ultrasonic, temperature or climate sensors, transmit the measured vehicle data to the control unit 40. Here, unless the sensors have not done so already, the data are provided with a time stamp and a location stamp.

In a next step S200 of the method according to the present disclosure, the vehicle 10 receives group information from other vehicles 63 by means of the first communication module 20 and by means of vehicle-to-vehicle communication. Therein, the group information is transmitted to the motor vehicle 10 only by such vehicles 63 that also transmit vehicle data sets to the network server 70. The group information contains, for each additional vehicle 63, information regarding the location, the speed and the direction of travel of this vehicle 63. The group information is also used to determine traffic flow data, in particular a traffic flow forecast in the vicinity of vehicle 10 is calculated or estimated.

In a step S301, the vehicle 10 anonymizes the data set, which is based off of the traffic flow data by locally concealing the information regarding the location of the data capture and/or by temporally concealing the information regarding the time of the data capture, as described in detail herein. In step S401, the data set that has been anonymized in this way is transmitted to the network server 70. Alternatively, in step S302, the vehicle transmits the data set of the vehicle data including the information regarding the location and/or the time of the data capture and traffic flow data to the network server 70, wherein the traffic flow data are based on group information was received by means of vehicle-to-vehicle communication from other vehicles. According to this example, in step S402, the network server anonymizes the data set on the basis of the traffic flow data by locally concealing the information regarding the location of the data capture and/or by temporally concealing the information regarding the time of the data capture, as described in detail below.

In steps S301 or S402, the required temporal or spatial shift is first determined based on the traffic flow forecast in order to conceal the identity of the vehicle 10 in a defined anonymization group. In this context, an anonymization group is understood as a group in which an individual remains anonymous despite his or her actions, e.g., the individual is a non-recognizable part of the group. By specifying the anonymization group, for example, a totality of twenty vehicles 63 and based on the traffic flow forecast regarding the location of the data capture, the time range can be determined inside which such a totality of vehicles 63 passes the capture location (temporal concealment) or inside which area around the capture location a sufficient totality of vehicles 63 is available (local concealment).

By means of the time range determined in this way or the local area (radius) determined in this way, the time stamp or the location stamp of the data set is changed to such an extent that the identity of the vehicle 10 is sufficiently hidden in the predefined anonymization group of vehicles 63. Since all of the vehicles 63 of the anonymization group are vehicles that are also transmitting data sets to the network server 70, the security of the anonymization is advantageously high. In the context of the anonymizing action, the degrees of freedom of the incoming data sets with regard to shifting the time and location stamp are taken into account, if necessary, to prevent the usability of the data from being significantly restricted by the anonymization.

The time stamp is preferably shifted by or within the determined time range. If the shift occurs within the time range, the shift to the measurement time is calculated by means of a random algorithm and added to the measurement data. The location stamp is preferably shifted by or within the determined local area. If the shift takes place within the specific local area, the shift on the location stamp is calculated by means of a random algorithm and added to the measurement data. To prevent map matching, the shift therein preferably occurs along the route that has already been driven or the route that is still ahead of the vehicle.

After the anonymization, the data, advantageously, have been changed in such a way that the individual data can no longer, or only with a disproportionately large amount of time, cost and effort, be assigned to a specific or identifiable vehicle and thus to a specific or identifiable natural person. Examples of data that are locally concealed are rain and weather data, which can be captured for a weather service, for example. Such data can be integrated into a km grid, for example, without the value of the data being excessively reduced. Still, nevertheless, it is no longer possible to use said data for drawing conclusions about personal data.

Examples of data that are temporally concealed are, for example, data from recognized signs. Said data are constant in terms of time, which is why, even a shift of the point in time of capture by several hours, only conditionally reduces the value of said data. At the same time, it is practically impossible to draw any conclusions about the driver.

The disclosed configurations directed to the local and temporal concealment provide increased group anonymity. This is understood to mean that the captured data can only be assigned to a sufficiently large group of vehicles, and not to a single vehicle or to just a few vehicles. Herein, it can be relevant where and when the data is recorded. During the daytime, on a motorway, a measured value of a large number of vehicles is usually captured within a short amount of time. A small concealment is sufficient here. At night, on a back road with little traffic, a measured value may only be captured from a single vehicle. In this case, extensive concealment is necessary. This fact is taken into account according to the present disclosure by considering the group information.

LIST OF REFERENCE NUMERALS 10 motor vehicle
11 first sensor
12 second sensor
13 third sensor
20 communication module
21 memory
22 transponder
30 driving system
31 memory
32 navigation module
40 control unit
41 memory
42 CPU
51 fourth sensor
52 fifth sensor
53 sixth sensor
61 satellite
62 base station
63 other motor vehicle
70 network server
80 control unit
81 memory
82 CPU
90 communication module
91 transponder
92 memory
100 system

The invention claimed is:

1. A method for anonymizing networked motor vehicle data, comprising:
   receiving a data set associated with captured vehicle data, the data set comprising information regarding the location and/or time of the data capture;
   receiving group information from other vehicles via vehicle-to-vehicle communication;
   determining traffic flow data on the basis of the group information received via the vehicle-to-vehicle communication;
   anonymizing the data set on the basis of the traffic flow data by locally concealing the information regarding the location of the data capture and/or by temporally concealing the information regarding the time of the data capture; and
   transmitting the anonymized data set to a network server.

2. The method according to claim 1, wherein the captured vehicle data comprises vehicle data captured via at least one first sensor that is configured to capture environmental data.

3. The method according to claim 1, wherein the captured vehicle data comprises vehicle data captured via at least one second sensor that is configured to capture vehicle data.

4. The method according to claim 1, wherein the vehicle-to-vehicle communication takes place via a first communication module.

5. The method according to claim 1, wherein the group information comprises information indicating that the other vehicles also transmit data sets to the network server.

6. The method according to claim 1, wherein a level of the local and/or temporal concealment is inversely proportional to a group size of the other vehicles determined, based on the given group information.

7. The method according to claim 1, wherein the group information comprises information specifying a location, speed, and/or direction of travel of the other vehicles.

8. The method according to claim 1, wherein the traffic flow data are based on environmental data captured by vehicle sensors.

9. A system for anonymizing networked motor vehicle data, comprising:
    at least one first sensor, configured to capture environmental data;
    at least one second sensor, configured to capture vehicle data;
    a first communication module, configured for communicating with a network server and other motor vehicles; and
    a first control unit, wherein the control unit is configured to
        receive group information from other vehicles via vehicle-to-vehicle communication;
        determine traffic flow data on the basis of the group information received via the vehicle-to-vehicle communication;
        anonymize the data set on the basis of the traffic flow data by locally concealing the information regarding the location of the data capture and/or by temporally concealing the information regarding the time of the data capture; and
        transmit the anonymized data set to a network server.

10. The system according to claim 9, wherein the vehicle-to-vehicle communication takes place via the first communication module.

11. The system according to claim 9, wherein the group information comprises information indicating that the other vehicles also transmit data sets to the network server.

12. The system according to claim 9, wherein a level of the local and/or temporal concealment is inversely proportional to a group size of the other vehicles determined, based on the given group information.

13. The system according to claim 9, wherein the group information comprises information specifying a location, speed, and/or direction of travel of the other vehicles.

14. The system according to claim 9, wherein the traffic flow data are based on environmental data captured by the at least one first sensor.

15. A method for anonymizing vehicle data on a network server, comprising:
    receiving a data set comprising captured vehicle data from a motor vehicle, wherein the data set comprises information regarding the location and/or time of the data capture;
    receiving traffic flow data from the motor vehicle, wherein the traffic flow data comprises group information that is received from other vehicles via vehicle-to-vehicle communication; and
    anonymizing the data set on the basis of the traffic flow data by locally concealing the information regarding the location of the data capture and/or by temporally concealing the information regarding the time of the data capture.

16. The method according to claim 15, wherein the group information comprises information indicating that the other vehicles also transmit data sets to the network server.

17. The method according to claim 15, wherein a level of the local and/or temporal concealment is inversely proportional to a group size of the other vehicles determined, based on the given group information.

18. The method according to claim 15, wherein the group information comprises information specifying a location, speed, and/or direction of travel of the other vehicles.

19. The method according to claim 15, wherein the traffic flow data are based on environmental data captured by vehicle sensors.

* * * * *